United States Patent
Zhao et al.

(10) Patent No.: US 9,590,776 B2
(45) Date of Patent: Mar. 7, 2017

(54) METHOD, SYSTEM AND DEVICE FOR CALIBRATING DEVIATION AMONG MULTIPLE ACCESS POINTS

(71) Applicant: ZTE Corporation, Shenzhen (CN)

(72) Inventors: Yajun Zhao, Shenzhen (CN); Linmei Mo, Shenzhen (CN); Chen Huang, Shenzhen (CN); Hanqing Xu, Shenzhen (CN); Yujie Li, Shenzhen (CN); Baoyu Sun, Shenzhen (CN); Qian Wang, Shenzhen (CN); Yunfeng Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 51 days.

(21) Appl. No.: 14/389,588

(22) PCT Filed: Apr. 10, 2013

(86) PCT No.: PCT/CN2013/074003
§ 371 (c)(1),
(2) Date: Sep. 30, 2014

(87) PCT Pub. No.: WO2013/152720
PCT Pub. Date: Oct. 17, 2013

(65) Prior Publication Data
US 2015/0055496 A1 Feb. 26, 2015

(30) Foreign Application Priority Data

Apr. 12, 2012 (CN) .......................... 2012 1 0106029

(51) Int. Cl.
*H04L 5/00* (2006.01)
*H04W 56/00* (2009.01)
(Continued)

(52) U.S. Cl.
CPC ......... *H04L 5/0035* (2013.01); *H04B 7/0417* (2013.01); *H04B 17/11* (2015.01);
(Continued)

(58) Field of Classification Search
CPC .... H04B 17/11; H04B 17/364; H04B 7/0417; H04L 1/0026; H04L 5/0035; H04W 24/08;
(Continued)

(56) References Cited

U.S. PATENT DOCUMENTS

| 8,638,867 | B2 * | 1/2014 | Roman | ................... H04B 7/024 375/260 |
| 2012/0275507 | A1 * | 11/2012 | Roman | ................... H04B 7/024 375/226 |

(Continued)

FOREIGN PATENT DOCUMENTS

| CN | 101005313 A | 7/2007 |
| CN | 101841361 A | 9/2010 |

(Continued)

OTHER PUBLICATIONS

International Search Report of PCT/CN2013/074003, dated Jul. 18, 2013.

*Primary Examiner* — Chi H Pham
*Assistant Examiner* — Robert Lopata
(74) *Attorney, Agent, or Firm* — Banner & Witcoff, Ltd.

(57) ABSTRACT

The embodiment of the present invention discloses a method, a system and an apparatus for calibrating deviation among multiple access points, which are used for solving a problem that information received by a user equipment (UE) is not synchronous, caused when different access points send data to the UE at the same time, and improving system performance and frequency spectrum efficiency. The method for calibrating deviation among multiple access points com- (Continued)

prises the following steps: in step A: a base station sending to a UE a message instructing the UE to perform measurement and return deviation calibration information among the multiple access points (S101); and in step B: the base station calibrating the deviation among the multiple access points based on the deviation calibration information among the multiple access points returned by the UE (S102).

16 Claims, 2 Drawing Sheets (51) Int. Cl.
H04L 1/00 (2006.01)
H04B 7/04 (2006.01)
H04W 24/08 (2009.01)
H04W 72/04 (2009.01)
H04B 17/11 (2015.01)
H04B 17/364 (2015.01)

(52) U.S. Cl.
CPC ......... *H04B 17/364* (2015.01); *H04L 1/0026* (2013.01); *H04W 24/08* (2013.01); *H04W 56/00* (2013.01); *H04W 56/001* (2013.01); *H04W 72/0413* (2013.01)

(58) Field of Classification Search
CPC H04W 56/00; H04W 56/001; H04W 72/0413
USPC .......................................................... 370/252
See application file for complete search history.

(56) References Cited

U.S. PATENT DOCUMENTS

2012/0307704 A1* 12/2012 Roman ............... H04W 56/004
370/312
2014/0348138 A1* 11/2014 Ono ..................... H04W 56/001
370/336
2015/0004992 A1* 1/2015 Tanaka ................... H04B 7/024
455/450

FOREIGN PATENT DOCUMENTS

| CN | 102685874 A | 9/2012 |
| WO | 0014907 A1 | 3/2000 |
| WO | 0180461 A1 | 10/2001 |
| WO | 2010076854 A1 | 7/2010 |
| WO | 2011063047 A1 | 5/2011 |

* cited by examiner

FIG. 1

```
┌─────────────────────────────────────────────┐
│   A base station sends to a user equipment  │
│   (UE) a message instructing the UE to      │──── S101
│   perform measurement and return deviation  │
│   calibration information among the         │
│   multiple access points                    │
└─────────────────────────────────────────────┘
┌─────────────────────────────────────────────┐
│ The base station calibrates the deviation   │──── S102
│ among the multiple access points based on   │
│ the deviation calibration information       │
└─────────────────────────────────────────────┘
```

FIG. 2

```
┌─────────────────────────────────────────────┐
│ a user equipment (UE) receives a message    │
│ instructing the UE to perform measurement   │──── S111
│ and return deviation calibration            │
│ information among the multiple access       │
│ points sent by a base station               │
└─────────────────────────────────────────────┘
┌─────────────────────────────────────────────┐
│ The UE measures the deviation calibration   │
│ information among the multiple access       │──── S112
│ points, and returns the deviation           │
│ calibration information to the base station │
│ based on an instruction of the base station │
└─────────────────────────────────────────────┘
```

METHOD, SYSTEM AND DEVICE FOR CALIBRATING DEVIATION AMONG MULTIPLE ACCESS POINTS

TECHNICAL FIELD

The present document relates to the communication technology field, and in particular, to a method, a system and an apparatus for calibrating deviation among multiple access points (AP).

BACKGROUND OF THE RELATED ART

In the communication technology field, with the constant improvement of the requirement on the future communication by people, the edge frequency spectrum efficiency of the cell is paid more attention to. In the advanced long term evolution (LTE-Advanced) system, in order to further improve the system performance and the frequency spectrum efficiency of the edge user, the Coordinated multi-point transmission/reception (Comp) technology is provided. The Comp technology is that the User Equipment (UE) utilizes the antenna of the multiple access points (AP) to cooperate to transmit and receive information. The Comp technology can solve the problem of the information interference of the cell effectively, thus improving the information capacity and the dependability of the wireless link.

Figure 1:
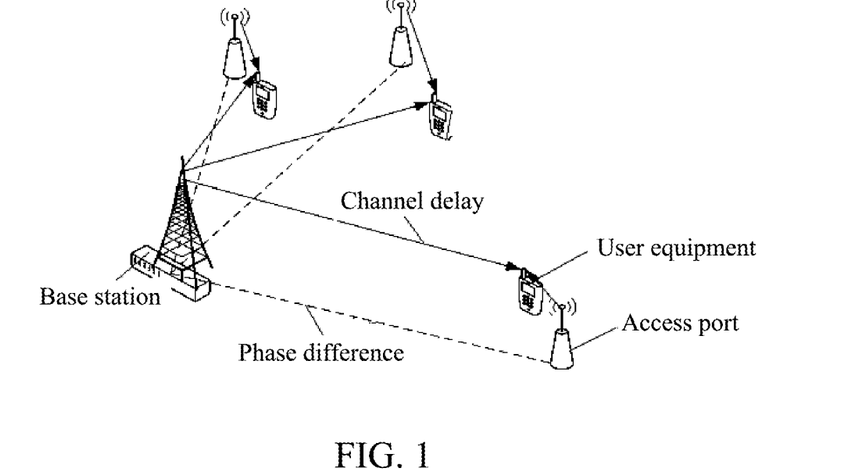
FIG. 1 is a diagram of a communication system of multiple points in the Comp cooperation in the related art.

Referring to FIG. 1, one or more access points can be set under one base station or one cell, the multiple points cooperated in the Comp can be multiple access points from one cell and also can be multiple access points from multiple cells. Wherein, the cell includes a primary cell and a cooperation cell of the user (UE) terminal. But because the AP points of the Comp are distributed in different geographical locations, when multiple AP points transmit the downlink data to one UE at the same time, the difference of the time for the data sent from different APs arriving at the UE causes a certain channel delay inequality of the information which reaches the UE. The channel delay inequality will bring the phase rotate deviation of the information frequency domain, and cause the phase that the information reaches the UE to have a certain deviation. Meanwhile, when multiple AP points send the data at the same time, different AP points will have a certain timing synchronization deviation with each other, which makes the time for different AP points to send the data to the same UE to have a certain out-sync. Specifically, in the current Comp technology, there are two precoding feedback realization mechanisms of the information: first is a global precoding, that is, the multiple AP points jointly feed back one global codebook, there is no phase deviation of the information, but only the delay inequality; second is a local precoding+relevant information among the AP points, that is, each AP point correspondingly measures and feeds back one independent codebook respectively, and feeds back the relevant information among the AP points at the same time. Wherein, the relevant information among the AP points includes: the independent Precoding Matrix Indication (PMI) based on the feedback, measuring and feeding back phase calibration information between the two APs, or the feedback channel delay inequality between the two AP points.

Because of the accumulation result of the above-mentioned channel delay inequality and/or the timing synchronization deviation among the AP points, it makes the data sent by different AP points of the Comp to one UE at the same time have a certain channel delay inequality with each other, causing the system performance reduced. Through calibrating the deviation of different AP points, it obtains that there is no deviation in the timing synchronization of the AP points sending the data, the channel delay inequality is zero and the phase deviation is zero, and the system performance will be improved.

In the related art, no matter it is the independent feedback coding of each AP point or the global precoding, the UE feeds back the phase calibration information alone, to overcome the phase rotation deviation of the frequency domain brought by the delay inequality, and the UE needs to feed back the phase calibration information with smaller granularity of the frequency domain, which will make the feedback expense larger; if the delay inequality information is fed back alone, the phase difference problem brought by feeding back the codebook by each AP independently cannot be solved.

In sum, the related art is unable to solve the phase difference problem brought by feeding back the codebook by each AP independently under the condition that the feedback expense is smaller, and unable to solve the problem of the delay inequality among the AP points, therefore, the system performance and the frequency spectrum efficiency are relatively low.

SUMMARY OF THE INVENTION

The embodiment of the present document provides a method, a system and an apparatus for calibrating deviation among multiple access points, to solve the problem that there is a deviation among different AP access points with each other when different AP access points send the data to one UE at the same time, thus improving the system performance and the frequency spectrum efficiency.

A method for calibrating deviation among multiple access points provided by the embodiment of the present document comprises:

in step A: a base station sending to a user equipment (UE) a message instructing the UE to perform measurement and return deviation calibration information among the multiple access points; and in step B: the base station calibrating the deviation among the multiple access points based on the deviation calibration information among the multiple access points returned by the UE.

Another method for calibrating deviation among multiple access points provided by the embodiment of the present document comprises:

in step A: a user equipment (UE) receiving a message instructing the UE to perform measurement and return deviation calibration information among the multiple access points sent by a base station; and in step B: the UE measuring the deviation calibration information among the multiple access points, and returning the deviation calibration information to the base station based on an instruction of the base station.

A base station provided by the embodiment of the present document comprises:

an information sending unit: configured to send to a user equipment (UE) a message instructing the UE to perform measurement and return deviation calibration information among multiple access points; and a deviation calibration unit: configured to calibrate a deviation among the multiple access points based on the deviation calibration information among the multiple access points returned by the UE.

A user equipment (UE provided by the embodiment of the present document comprises:

an information receiving unit, configured to: receive a message instructing the UE to perform measurement and return deviation calibration information among multiple access points sent by a base station; and an information sending unit, configured to: measure the deviation calibration information among the multiple access points, and return the deviation calibration information to the base station based on an instruction of the base station.

A communication system provided by the embodiment of the present document comprises:

a base station, configured to send to a user equipment (UE) a message instructing the UE to perform measurement and return deviation calibration information among multiple access points; and calibrate the deviation among the multiple access points based on the deviation calibration information among the multiple access points returned by the UE; and a user equipment (UE): configured to receive a message instructing the UE to perform the measurement and return the deviation calibration information among the multiple access points sent by the base station; and measure the deviation calibration information among the multiple access points and return the deviation calibration information to the base station based on an instruction of the base station.

In the embodiment of the present document, a base station sends to a user equipment (UE) a message instructing the UE to perform measurement and return deviation calibration information among the multiple access points; and the base station calibrates the deviation among the multiple access points based on the deviation calibration information among the multiple access points returned by the UE. It solves the problem that there is a deviation among different AP access points with each other when different AP access points send the data to one same UE, thus improving the system performance and the frequency spectrum efficiency.

PREFERRED EMBODIMENTS OF THE
PRESENT INVENTION

The embodiment of the present document provides a method, a system and an apparatus for calibrating deviation among multiple access points (AP), which are used for solving the problem that there is the deviation with each other among different access points when transmitting data to the UE at the same time, thus increasing the system performance and the frequency spectrum efficiency.

The mode of the Comp technology cooperates to transmit the user data through multiple access points of multiple cells or multiple access points of one cell improves the signal receiving quality of the user equipment and reduces the interference among the cells, thus improving the system capacity and the frequency spectrum efficiency of the edge user effectively.

In the embodiment of the present document, a base station sends to a user equipment (UE) a message instructing the UE to perform measurement and return deviation calibration information among the multiple access points; the UE measuring the deviation calibration information and returning the deviation calibration information which is returned by the instruction of the base station according to the instruction; and the base station calibrating the deviation among the multiple access points based on the deviation calibration information among the multiple access points returned by the UE.

The delay inequality can include a timing synchronization deviation and a channel delay inequality of all access points sending the data at the same time, and also can only include the channel delay inequality or the timing synchronization deviation. The deviation calibration information can include phase calibration information and a delay inequality at the same time, and also can only include the phase calibration information or only include the delay inequality. When the UE feeds back only the phase calibration information, the base station detects the delay inequality itself. When the UE feeds back only the phase calibration information and the channel delay inequality, the base station detects the timing synchronization deviation by itself.

The delay inequality and the phase calibration information are measured through the mutual cooperation of the base station and the UE, or only the delay inequality is measured, and the base station adjusts every access point to send the data to the UE according to the obtained delay inequality and phase calibration information or the obtained delay inequality. The delay inequality and the phase difference caused by every access point sending the data are eliminated, and the system performance is improved.

The technical scheme provided by the embodiment of the present document is illustrated in details from the base station side and the user equipment (UE) side respectively through the accompanying drawings hereinafter.

The technical scheme provided by the embodiment of the present document is illustrated from the base station side at first.

Figure 2:
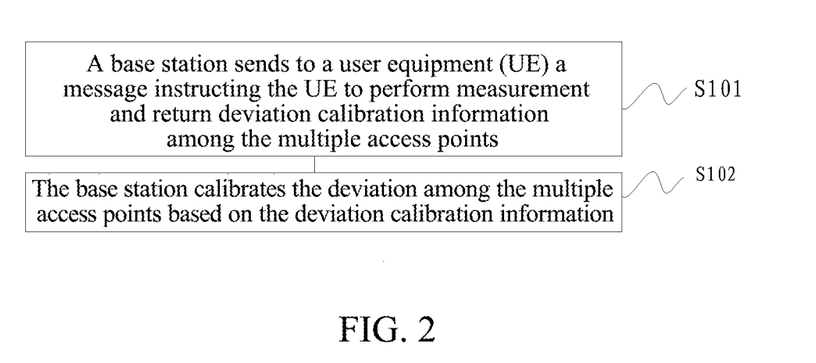
FIG. 2 is a whole flow chart of a method for calibrating deviation of different access points provided by an embodiment of the present document.

Referring to FIG. 2, the embodiment of the present document provides a method for calibrating deviation among multiple access points, including the following steps:

in S101: a base station sends to a user equipment (UE) a message instructing the UE to perform measurement and return deviation calibration information among the multiple access points; and in S102: the base station calibrates the deviation among the multiple access points based on the deviation calibration information among the multiple access points returned by the UE.

Preferably, the base station sends to the UE a message instructing the UE to measure a delay inequality and phase calibration information among the multiple access points and instructing the UE to return the delay inequality and the phase calibration information; and the base station calibrates the delay inequality and a phase difference among the multiple access points based on the delay inequality and the phase calibration information among the multiple access points returned by the UE.

Preferably, the base station can instruct the UE to only return the phase calibration information, and the base station measures the delay inequality among all access points by itself, in this way, it can save the expense of the data feedback. Specifically, the base station sends to the UE a message instructing the UE to measure a delay inequality and phase calibration information among the multiple access points, and instructing the UE to return the phase calibration information among the multiple access points obtained from the measurement; and the base station calibrates the delay inequality and a phase difference among the multiple access points based on the phase calibration information among the multiple access points returned by the UE and the delay inequality obtained by the measurement of the base station itself.

Preferably, the delay inequality includes the channel delay inequality generated by the information from every access point to the UE, and the timing synchronization deviation of every access point.

Preferably, in the process of the UE returning the delay inequality, it can only return the channel delay inequality, and the base station itself measures the timing synchronization deviation. Specifically, the base station sends to the UE a message instructing the UE to measure a delay inequality and phase calibration information among the multiple access points, and instructing the UE to return a channel delay inequality in the delay inequality obtained by the measurement and the phase calibration information obtained by the measurement; and the base station calibrates the delay inequality and a phase difference among the multiple access points based on the channel delay inequality and the phase calibration information among the multiple access points returned by the UE, and a timing synchronization deviation in the delay inequality among the multiple access points obtained by the measurement of the base station itself.

Preferably, the base station sends to the UE a message instructing the UE to measure a delay inequality, phase calibration information and amplitude calibration information among the multiple access points and instructing the UE to return the phase calibration information and the amplitude calibration information; and the step B includes: the base station calibrating the delay inequality and a phase difference among the multiple access points based on the delay inequality, the phase calibration information and the amplitude calibration information among the multiple access points returned by the UE, and the delay inequality obtained by the measurement of the base station itself;

or, the step A includes: the base station sending to the UE a message instructing the UE to measure the delay inequality, the phase calibration information and the amplitude calibration information among the multiple access points and instructing the UE to return the phase calibration information, the amplitude calibration information and the delay inequality; and the step B includes: the base station calibrating the delay inequality and the phase difference among the multiple access points based on the phase calibration information, the amplitude calibration information and the delay inequality returned by the UE;

or, the step A includes: the base station sending to the UE the message instructing the UE to measure the delay inequality, the phase calibration information and the amplitude calibration information among the multiple access points and instructing the UE to return the phase calibration information, the amplitude calibration information and the channel delay inequality; and the step B includes: the base station calibrating the delay inequality and the phase difference among the multiple access points based on the phase calibration information, the amplitude calibration information and the channel delay inequality among the multiple access points returned by the UE, and a timing synchronization deviation in the delay inequality among the multiple access points obtained by the measurement of the base station itself.

The above-mentioned method for calibrating deviation among multiple access points is the communication system of the precoding feedback mechanism for the independent precoding of every access point.

For the communication system of the global precoding, there is no phase deviation among every access point, while there is only the delay inequality; specifically, the method for calibrating deviation among multiple access points includes:

the base station sending to the UE a message instructing the UE to measure a delay inequality among the multiple access points and instructing the UE to return the delay inequality; and the base station calibrating the delay inequality among the multiple access points based on the delay inequality among the multiple access points returned by the UE.

Preferably, it can be: the base station sending to the UE instructing the UE to measure a delay inequality among the multiple access points; and the base station calibrating the delay inequality among the multiple access points based on the delay inequality among the multiple access points obtained by the measurement of the base station itself. In this way, the information feedback expense can be saved.

The technical scheme provided by the embodiment of the present document is illustrated from the user equipment (UE) side hereinafter.

Figure 3:
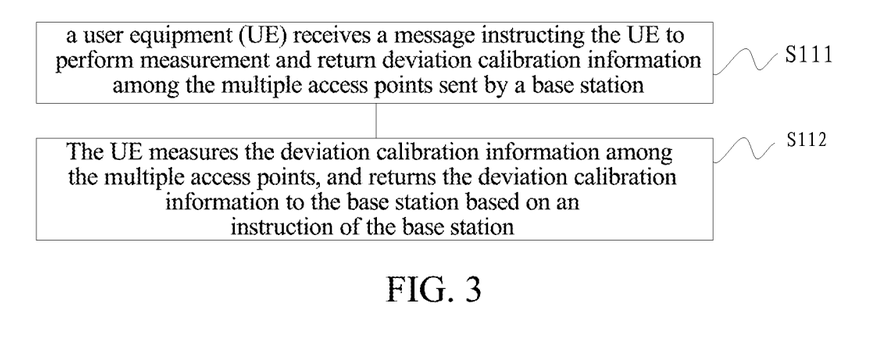
FIG. 3 is a whole flow chart of a method for calibrating deviation of different access points provided by an embodiment of the present document.

Referring to FIG. 3, the embodiment of the present document provides a method for calibrating deviation among multiple access points, including the following steps:

in S111: a user equipment (UE) receives a message instructing the UE to perform measurement and return deviation calibration information among the multiple access points sent by a base station; and in S112: the UE measures the deviation calibration information among the multiple access points, and returns the deviation calibration information to the base station based on an instruction of the base station.

Specifically, the UE receives a message sent by the base station instructing the UE to perform measurement and return a delay inequality and phase calibration information among the multiple access points; and the UE measures the delay inequality and the phase calibration information and returns the delay inequality and the phase calibration information to the base station based on the instruction of the base station.

Preferably, the UE receives a message instructing the UE to measure a delay inequality and phase calibration information among the multiple access points and return the phase calibration information obtained from the measurement sent by the base station; and the UE returns the phase calibration information to the base station; and the base station calibrates the delay inequality and phase information according to the phase calibration information returned by the UE and the delay inequality obtained by the measurement of the base station itself. The data feedback expense is saved by feeding back only the phase calibration information.

Preferably, the delay inequality includes a channel delay inequality and a timing synchronization deviation.

Preferably, the method for calibrating deviation among multiple access points further can be: the UE receiving a message instructing the UE to measure a delay inequality and phase calibration information among the multiple access points sent by the base station and instructing the UE to return a channel delay inequality and the phase calibration information obtained from the measurement, wherein, the delay inequality comprises a timing deviation and the channel delay inequality; and the UE measuring the delay inequality and the phase calibration information and returning the channel delay inequality and the phase calibration information to the base station based on the instruction of the base station, and the base station calibrating the delay inequality and a phase difference according to the channel delay inequality, the phase calibration information and the timing deviation obtained by the measurement of the base station itself.

Preferably, the UE measures the phase calibration information, including, according to a channel matrix of every access point, measuring the delay inequality among all access points, amending the channel matrix of every access point according to the delay inequality obtained by the measurement, and measuring the phase calibration deviation according to the amended channel matrix.

The measuring the phase calibration deviation according to the amended channel matrix includes specifically: performing the measurement on the precoding matrix indication (PMI) according to the amended channel matrix, and measures the phase calibration deviation according to the PMI value.

Preferably, the method for calibrating deviation among multiple access points provided by the embodiment of the present document can further include: the UE receiving a message instructing the UE to perform measurement and return amplitude calibration information among the multiple access points sent by the base station; and the UE measuring the amplitude calibration information and returning the amplitude calibration information to the base station based on the instruction of the base station.

The above-mentioned method for calibrating deviation among multiple access points is the communication system of the precoding feedback mechanism for the independent precoding of every access point.

For the communication system of the global precoding, there is no phase deviation among every access point, while there is only the delay inequality; specifically, the method for calibrating deviation among multiple access points includes:

the UE receiving information instructing the UE to measure a delay inequality among the multiple access points and instructing the UE to return the delay inequality obtained by the measurement sent by the base station; and the UE measuring the delay inequality and returning the delay inequality to the base station based on the instruction of the base station.

Preferably, regardless of the communication system for the global precoding or the independent precoding, the UE returns the delay inequality or the phase calibration information to the base station, or returns the delay inequality and the phase difference, and meanwhile, it carries precoding matrix indication information, and the precoding matrix indication information is used for instructing the base station to encode the data sent to the UE; wherein, the precoding matrix indication is obtained by the measurement after the UE amends the channel matrix of every access point.

Preferably, in the technical scheme provided by the embodiment of the present document, the UE measures one delay inequality aiming at a bandwidth of a whole system based on the instruction of the base station, while not measures the delay inequality aiming at each sub-band in the while bandwidth, which reduces the expense of the calculation or measurement of the system, improves the efficiency of measuring the delay inequality, and reduces the feedback expense caused when the UE returns the delay inequality to the base station.

Preferably, when feeding back the phase calibration deviation to the base station, the precoding matrix indication (PMI) is sent to the base station, so that the base station calibrates the phase of every access point by using the phase calibration deviation corresponding to the PMI and fed back by the UE when it performs the phase calibration.

Different embodiments of the above-mentioned technical scheme provided by the present document are provided from both the user equipment side and the base station side hereinafter.

It is supposed that the Comp cell assembly includes multiple access points AP1, AP2 and AP3 coming from one cell, or includes the multiple access points AP1, AP2 and AP3 coming from multiple different cells.

In embodiment one: it is supposed that the access points AP1 and AP2 send the downlink data to the UE at the same time. The UE measures and feeds back the phase calibration information (PCI) and the delay inequality of the access points AP1 and AP2 at the same time.

The method for calibrating the deviation between the AP1 and the AP2 includes the following steps.

In step one, the base station configures the UE to perform the measurement and feedback of the delay inequality and the phase calibration information between the AP1 and the AP2.

The base station configures the UE to perform the measurement of the delay inequality and the measurement of the phase calibration information between the AP1 and the AP2, and configures the UE to feed back the delay inequality and the phase calibration information obtained from the measurement to the base station. Wherein, the PCI is the measurement value after calibrating the delay inequality between the AP1 and the AP2. The delay inequality includes the channel delay inequality and the timing synchronization deviation.

In step two, based on the instruction of the base station, the delay inequality is calculated. That is, the UE configures the information based on the base station, measures the delay inequality between the AP1 and the AP2, and amends the delay inequality for the channel matrix of the two APs.

Measuring the delay inequality between the AP1 and the AP2 includes: the timing synchronization deviation $\Delta t1$ of the AP1 and the AP2, and the channel delay inequality $\Delta t2$ caused on the channel by the information reaching the UE from the AP1 and the information reaching the UE from the AP2 respectively.

The UE measures the downlink data arrival time, t1 and t2, of the AP1 and the AP2 based on the configuration of the base station, and then calculates the delay inequality, $\Delta t$ ($\Delta t1+\Delta t2$), between the AP1 and the AP2 according to the time t1 and t2.

The UE measures the signal arrival time, t1 and t2, of the AP1 and the AP2 and it generally performs the measurement based on the downlink reference signal of the AP1 and the AP2 respectively (such as, the CSI-RS or CRS corresponding to different APs), and also can perform the measurement based on the synchronous channel or the PRS, etc.

The bandwidth of the communication system includes multiple sub bands, called the sub-band, with different frequencies. The UE can perform the measurement of the delay inequality for each sub-band, and one sub-band corresponds to one delay inequality. It can also perform the measurement of the delay inequality for the whole bandwidth, for which only one delay inequality is measured. For example, it is supposed that the system bandwidth includes n sub-bands with different frequencies. The UE respectively measures the delay inequality between the sub-band 1 of the bandwidth of the downlink data sent by the AP1 and the sub-band 1 of the bandwidth of the downlink data sent by the AP2, measures the delay inequality between the sub-band 2 of the bandwidth of the downlink data sent by the AP1 and the sub-band 2 of the bandwidth of the downlink data sent by the AP2, and so on and so forth, measures the delay inequality between the sub-band n of the bandwidth of the downlink data sent by the AP1 and the sub-band n of the bandwidth of the downlink data sent by the AP2.

Preferably, in the process of the UE feeding back the delay inequality to the base station, in order to save the feedback expense, the whole system bandwidth can only measure and receive one piece of delay inequality information. And there is no need to measure and obtain different delay inequalities respectively for the sub-bands of different frequencies. When the delay inequality is fed back to the base station, the amount of information is relatively small, which saves the occupancy rate of the channel resources; and it can save the calculation expense and improve the efficiency when UE measures the delay inequality.

Performing the delay inequality amendment to the channel matrixes of the two APs includes: the UE, after measuring and obtaining the delay inequality between the AP1 and the AP2, performing the delay inequality amendment to the channel matrix H(AP1) and H(AP2) of the UE with the two AP points, and obtaining the amended channel matrix H'(AP1) and H'(AP2).

The amendment method of the delay inequality can be that: regarding some AP as the time reference, for example, regarding AP1 as the time standard, then the AP2 is amended to be aligned with the time of the AP1.

The selection method for the time reference of the AP point can be that: it is default that the AP is the AP point corresponding to the cell that the UE stays; alternatively, the AP point is calibrated and referred by the delay inequality assigned by the base station, and the AP point needs to be known by both the base station and the UE.

In step three, the UE performs the measurement and calculation of the respective independent precoding matrix indication (PMI) and the corresponding phase calibration information (PCI) of the AP1 and the AP2 based on the amended channel matrix.

For the amended channel matrix H' (AP1) and H' (AP2), the measurement of the precoding matrix indication (PMI) and the calculation of the corresponding PCI are performed.

It is supposed that the data bandwidth sent by the system includes two sub-bands, for the access point AP1: H1' (AP1) and H2' (AP1) are the amended channels corresponding to the two sub-bands; for the access point AP2: H1' (AP2) and H2' (AP2) are the amended channels corresponding to the two sub-bands. The time of H1' (AP1) is aligned with the H1' (AP2), and the time of H2' (AP1) is aligned with H2' (AP2). The PMI1 (AP1) is calculated for the H1' (AP1); and the PMI1 (AP2) is calculated for the H1' (AP2); the PCI1 between the first sub-band of the AP1 and the AP2 is calculated for the PMI1 (AP1) and the PMI1 (AP2). The same, the PMI2 (AP1) is calculated for the H2' (AP1); the PMI2 (AP2) is calculated for the H2' (AP2); the PCI2 between the second sub-band of the AP1 and the AP2 is calculated for the PMI2 (AP1) and the PMI2 (AP2). That is, the PCI1 corresponds to the phase calibration information between the first sub-band of the access points AP1 and AP2, and the PCI2 corresponds to the phase calibration information between the second sub-band of the access points AP1 and AP2.

It is supposed that the AP1 and the AP2 correspond to multiple sub-bands respectively, and then the PCIm is the phase calibration information among the m-th sub-band of every access point, wherein, m is greater than 2.

In step four, the UE feeds back the delay inequality, the PMI1 (AP1), the PMI1 (AP2), the PMI2 (AP1), the PMI2 (AP2), and the PCI1 and the PCI2 of the AP1 and the AP2 to the base station.

Because the delay inequality changes relatively slowly, so the feedback of delay inequality may be performed at a relatively lower frequentness. Because the deviations of the delay inequalities corresponding to different sub-bands are very small, in order to save to the expenses of the measurement feedback, the whole system bandwidth can only measure and feedback one delay inequality information, while it does not need to measure and feedback the delay inequalities of the sub-bands with different frequencies respectively.

The respective independent PMI of every access point and the corresponding PCI need to be fed back together. The PCI corresponds to the PMI of every AP point. For example, the PCI1 corresponds to the PMI1 (AP1) and the PMI1 (AP2); the PCI2 corresponds to the PMI2 (AP1) and the PMI2 (AP2); accordingly, the PCIm corresponds to the PMIm (AP1) and the PMIm (AP2).

In step five, the base station adjusts the AP1 and AP2 points to send the data to the UE according to the delay inequality and the PCI of the AP1 and the AP2 fed back by the UE. The precoding is performed to the message to be sent through the received PMI, and the information after the precoding is sent to the UE.

For the use of the PCI, if the PMI used in the AP1 and the AP2 by the base station scheduling UE is the PMI1(AP1) and the PMI1(AP2) respectively, then the PCI1 is used to adjust the phase of the AP1 and the AP2; if the PMI used in the AP1 and the AP2 by the base station scheduling UE is the PMI2(AP1) and the PMI2(AP2) respectively, then the PCI2 is used to adjust the phase of the AP1 and the AP2.

In the embodiment, the method for calibration the deviation between the AP1 and the AP2 further includes the following steps:

When the base station configures the UE to perform the phase calibration information, it configures the UE to measure and return the amplitude calibration information. The UE receives the indication of the base station, measures and returns the amplitude calibration information, and the amplitude calibration information can be returned to the base station with the phase calibration information. The amplitude calibration information is calculated for the amended channel matrix; that is to say, when the phase difference is amended, the amplitude difference is amended. The base station receives the amplitude calibration information, and the phase difference and the amplitude difference are calibrated according to the received phase calibration information and amplitude calibration information, to make the performance of the calibrated system be higher.

The present embodiment measures and feeds back the delay inequality and the phase calibration information of the data sent by every access point through configuring the UE, adjusts the relevant parameter of every access point, realizes calibrating the deviations of different AP points, and improves the system performance and the frequency spectrum efficiency.

In embodiment two, the base station itself measures and calibrates the delay inequality, and the UE measures the delay inequality and the PCI but only feeds back the PCI. In this way, it can reduce the expense brought by feeding back the data.

It is supposed that the access points AP1 and AP2 send the downlink data to the UE at the same time.

The method for calibrating the deviation between the AP1 and the AP2 includes the following steps.

In step one, the base station configures the UE to perform the measurement of the delay inequality and the measurement of the phase calibration information between the AP1 and the AP2, and configures the UE to feed back the phase calibration information between the AP1 and the AP2.

The base station configures the UE to perform the measurement of the delay inequality and the measurement of the phase calibration information between the AP1 and the AP2, and configures the UE to feed back the phase calibration information to the base station. Wherein, the phase calibration information (PCI) is the measurement value after calibrating the delay inequality between the AP1 and the AP2. Therefore, it needs to configure the UE to perform the measurement of the delay inequality.

In step two, based on the configuration of the base station, the UE measures the delay inequality between the AP1 and the AP2, and performs the delay inequality amendment on the channel matrixes of the AP1 and the AP2 (the step two is same with the step two in embodiment one).

The UE measures the delay inequality between the AP1 and the AP2 based on the configuration of the base station. The UE measures the signal arrival times of different APs, which is generally measured based on the respective downlink reference signal of the AP (such as the CSI-RS or CRS corresponding to different APs), and also can be measured based on the synchronous channel or the PRS, etc.

In order to save the expenses of the measurement feedback, the whole system bandwidth can only measure and obtain one piece of delay inequality information, while it does not need to measure the delay inequalities of the sub-bands with different frequencies respectively.

The UE, after measuring and obtaining the delay inequality between the AP1 and the AP2, performs the delay inequality amendment to the channel matrix H(AP1) and H(AP2) of the UE with the two AP points, and obtains the amended channel matrix H'(AP1) and H'(AP2). The UE performs the measurement and calculation of the respective independent PMI and the corresponding PCI of the AP1 and the AP2 based on the amended channel matrix.

It is supposed that the system bandwidth includes two sub-bands, for the access point AP1: H1' (AP1) and H2' (AP1) are the amended channels corresponding to the two sub-bands; for the access point AP2: H1' (AP2) and H2' (AP2) are the amended channels corresponding to the two sub-bands. The H1' (AP1) is aligned with the H1' (AP2), and the H2' (AP1) is aligned with H2' (AP2). The PMI1 (AP1) is calculated for the H1' (AP1); and the PMI1(AP2) is calculated for the H1' (AP2); the PCI1 is calculated for the PMI1(AP1) and the PMI1(AP2). The same, the PMI2(AP1) is calculated for the H2' (AP1); the PMI2(AP2) is calculated for the H2' (AP2); the PCI2 is calculated for the PMI2(AP1) and the PMI2(AP2). That is, the PCI1 corresponds to the phase calibration information between the first sub-band of the access points AP1 and AP2, and the PCI2 corresponds to the phase calibration information between the second sub-band of the access points AP1 and AP2.

The amendment method of the delay inequality is that: regarding some AP as the time reference, supposing that it is the AP1, then the AP2 is amended to be aligned with the time of the AP1.

The selection method for the time reference of the AP point is that: it is default that the AP is the AP point corresponding to the cell that the UE stays; alternatively, the AP point is calibrated and referred by the delay inequality assigned by the base station, and the AP point needs to be known by the base station and the UE together.

In step three, the UE feeds back the respective independent PMI of every access point and the corresponding PCI to the base station.

The respective independent PMI of every access point and the corresponding PCI need to be fed back together. The PCI corresponds to the PMI of every cooperation point. For example, the PCI1 corresponds to the PMI1 (AP1) and the PMI1 (AP2); and the PCI2 corresponds to the PMI2(AP1) and the PMI2(AP2).

In step four, the base station performs the delay inequality measurement between the AP1 and the AP2.

The delay inequality includes the channel delay inequality and the timing synchronization deviation.

The delay inequality measurement method can be that: the base station measures the uplink reference signal sent by the UE, such as, the SRS, and obtains the delay inequality of the channel transmission $\Delta t1$ among the UE with the AP1 and $\Delta AP2$; and the base station needs to measure the timing synchronization deviation $\Delta t2$ between the AP1 and AP2 points at the same time.

In step five, the base station, based on the PCI fed back by the UE and the delay inequality obtained by the measurement of itself, performs the delay inequality calibration and the phase calibration, and adjusts the AP1 and AP2 points to send the data to the UE.

That is to say, the contents in step one to step three in embodiment two are the same with the contents in step one to step four in the embodiment one. The difference lies in that, in embodiment two, after the UE measures the delay inequality and the phase calibration information, it only feeds back the phase calibration information to the base station, and the base station measures the delay inequality by itself, which reduces the channel resource expenses brought by feeding back the information.

Same, the embodiment can also further include the configuration to the amplitude calibration information by the base station, and the measurement and feedback of the amplitude calibration information by the UE; its specific process is same with the process related to the amplitude calibration information mentioned in embodiment one. The beneficial results that can bring are the same as well.

In embodiment three: the timing synchronization deviation between the AP1 and the AP2 is measured by the base station itself, and the UE just measures and feeds back the included channel delay inequality $\Delta t1$ between the AP1 and the AP2 brought by the wireless channel transmission, and measures and reports the PCI at the same time.

It is supposed that the access points AP1 and AP2 send the downlink data to the UE at the same time.

The method for calibrating the deviation between the AP1 and the AP2 includes the following steps.

In step one, the base station configures the UE to perform the measurement of the delay inequality and the phase calibration information between the AP1 and the AP2, and feeds back the channel delay inequality in the delay inequality.

The base station configures the UE to perform the measurement of the delay inequality and the measurement of the phase calibration information between the AP1 and the AP2. Wherein, both the base station and the UE suppose that the phase calibration information (PCI) is the measurement value after calibrating the delay inequality between the AP1 and the AP2, and suppose that the base station have already realized the timing synchronization deviation calibration between the AP1 and the AP2 very well.

In step two, based on the configuration of the base station, the UE measures the delay inequality between the AP1 and the AP2, and performs the delay inequality amendment on the channel matrixes of the two APs. Measuring the delay inequality and amending the delay inequality of the channel matrix are the same with the methods in embodiment one or embodiment two, and will not go into details here.

In step three, the UE feeds back the channel delay inequality, and the respective independent PMI of the AP1 and the AP2, and the corresponding PCI to the base station respectively.

Because the delay inequality changes relatively slowly, so the feedback of delay inequality may be performed at a relatively lower frequentness. Because the deviations of the delay inequalities corresponding to different sub-bands are very small, in order to save to the expenses of the measurement feedback, the whole system bandwidth can only measure and feedback one delay inequality information, while it does not need to measure and feedback the delay inequalities of the sub-bands with different frequencies respectively.

The respective independent PMI of every cooperation access point and the corresponding PCI need to be fed back together. The PCI corresponds to the PMI of every cooperation point. For example, the PCI1 corresponds to the PMI1 (AP1) and the PMI1 (AP2); and the PCI2 corresponds to the PMI2 (AP1) and the PMI2 (AP2).

In step four, the base station performs the timing synchronization deviation measurement between the AP1 and AP2 the, and performs the calibration.

The base station measures the timing synchronization deviation among every AP point, and the measurement method can include the following:

in the method one: every AP point receives a signal of a certain outside reference clock source (such as GPS, the Big Dipper system), and then it measures the timing synchronization deviation value of the outside reference source. Then the base station calibrates the timing synchronization deviation of the AP1 and the AP2.

In the method two: every AP point interacts the synchronization information with the reference AP point (that is, assuming the time of this AP point is the reference point, and the time offset amounts of other AP points are based on the time of the AP. The primary AP point is preferably configured as the reference point), and then calculates the timing synchronization deviation value of the AP point compared to the AP reference point. Then the base station calibrates the timing synchronization deviation of the AP1 and the AP2.

In step five, the base station adjusts the AP1 and AP2 points to send the data to the UE according to the channel delay inequality and the PCI of the AP1 and the AP2 fed back by the UE.

For the use of the PCI, if the PMI used in the AP1 and the AP2 by the UE scheduled by the base station is the PMI1 (AP1) and the PMI1 (AP2) respectively, then the PCI1 is used to calibrate the phase; if the PMI used in the AP1 and the AP2 by the UE scheduled by the base station is the PMI2 (AP1) and the PMI2(AP2) respectively, then the PCI2 is used to calibrate the phase.

Same, the embodiment can also further include the configuration to the amplitude calibration information by the base station, and the measurement and feedback of the amplitude calibration information by the UE; its specific process is same with the process related to the amplitude calibration information mentioned in embodiment one. The beneficial results that can bring are the same as well.

The above-mentioned three embodiments are for the method for calibrating the deviation between the AP1 and the AP2 under the independent precoding feedback in the Comp technology.

It needs to be illustrated that, in the above-mentioned three embodiments, the phase calibration information obtained from the measurement can be the phase calibration information of the channel matrix between the AP1 and the AP2; for example, if every element in the matrix needs to be amended and the amendments are same, then an amendment coefficient can be applied to the whole matrix, to obtain one phase calibration information.

It can also be the calibration information among the vectors in the matrixes of the AP1 and the AP2; for example, the phase calibration information includes: the calibration information between the vector 1 in the AP1 and the vector 1 the in AP2, and/or the calibration information between the vector 5 in the AP1 and the vector 5 in the AP2.

Or it can be the calibration information among the elements in the matrixes of the AP1 and the AP2. As to a certain matrix, when the elements located in different vectors need to be applied with different offset amounts, the measurement of the phase calibration information is performed to the element.

In other words, the expression form of the phase calibration information can be matrix, vector or element.

The method for calibrating the deviation between the AP1 and the AP2 under the global precoding feedback in the Comp technology is described hereinafter.

In embodiment four: the base station configures the UE to perform the measurement and feedback of the PMI and the delay inequality information of the global precoding.

It is supposed that the access points AP1 and AP2 send the downlink data to the UE at the same time.

The method for calibrating the deviation between the AP1 and the AP2 includes the following steps.

In step one, the base station configures the UE to perform the measurement and the feedback of the PMI of the global precoding between the AP1 and the AP2.

The base station configures the UE to perform the measurement and the feedback of the PMI of the global precoding between the AP1 and the AP2. Wherein, both the base station and the UE suppose that the PMI of the global precoding is the measurement value after calibrating the delay inequality between the AP1 and the AP2. The delay inequality includes the channel delay inequality and the timing synchronization delay inequality.

In step two, based on the configuration of the base station, the UE measures the delay inequality between the AP1 and the AP2, and performs the delay inequality amendment on the channel matrixes of the two APs.

The UE measures the delay inequality between the AP1 and the AP2 based on the configuration of the base station. The UE measures the signal arrival times of different APs, which is generally measured based on the respective downlink reference signal of the AP (such as the CSI-RS or CRS corresponding to different APs), and also can be measured based on the synchronous channel or the PRS, etc.

The UE, after measuring and obtaining the delay inequality between the AP1 and the AP2, performs the delay inequality amendment to the channel matrix H(AP1) and H(AP2) of the UE with the two AP points, and obtains the amended channel matrix H'(AP1) and H'(AP2). The UE performs the measurement and calculation of the global precoding PMI of the AP1 and the AP2 based on the amended channel matrix.

The amendment method of the delay inequality is that: regarding some AP as the time reference, supposing that it is the AP1, then the AP2 is amended to be aligned with the time of the AP1.

The selection method for the time reference of the AP point is that: it is default that the AP is the AP point corresponding to the cell that the UE stays; alternatively, the AP point is calibrated and referred by the delay inequality assigned by the base station, and the AP point needs to be known by the base station and the UE together.

In step three, the UE feeds back the PMI of the global precoding and the delay inequality of the AP1 and the AP2 to the base station.

In step four, the base station performs the delay inequality calibration based on the delay inequality fed back by the UE, adjusts the AP1 and AP2 points to send the data to the UE, and perform the precoding of the data of the UE by using the PMI of the global precoding fed back by the UE.

In embodiment five: the base station configures the UE to perform the measurement and feedback of the PMI of the global precoding, and the base station measures the delay inequality by itself.

It is supposed that the access points AP1 and AP2 send the downlink data to the UE at the same time.

The method for calibrating the deviation between the AP1 and the AP2 includes the following steps.

In step one, the base station configures the UE to perform the measurement and the feedback of the PMI of the global precoding between the AP1 and the AP2.

The base station configures the UE to perform the measurement and the feedback of the PMI of the global precoding between the AP1 and the AP2. Wherein, the PMI of the global precoding is the measurement value after calibrating the delay inequality between the AP1 and the AP2.

In step two, based on the configuration of the base station, the UE measures the delay inequality between the AP1 and the AP2, and performs the delay inequality amendment on the channel matrixes of the AP1 and the AP2.

The UE measures the delay inequality between the AP1 and the AP2 based on the configuration of the base station. The UE measures the signal arrival times of different APs, which is generally measured based on the respective downlink reference signal of the AP (such as the CSI-RS or CRS corresponding to different APs), and also can be measured based on the synchronous channel or the PRS, etc.

The UE, after measuring and obtaining the delay inequality between the AP1 and the AP2, performs the delay inequality amendment to the channel matrix H(AP1) and H(AP2) of the UE with the two AP points, and obtains the amended channel matrix H'(AP1) and H'(AP2). The UE performs the measurement and calculation of the global precoding PMI of the AP1 and the AP2 based on the amended channel matrix.

The amendment method of the delay inequality is that: regarding some AP as the time reference, supposing that it is the AP1, then the AP2 is amended to be aligned with the time of the AP1.

The selection method for the time reference of the AP point is that: it is default that the AP is the AP point corresponding to the cell that the UE stays;

alternatively, the AP point is calibrated and referred by the delay inequality assigned by the base station, and the AP point needs to be known by the base station and the UE together.

In step three, the UE feeds back the PMI of the global precoding to the base station.

In step four, the base station performs the measurement of the delay inequality between the AP1 and AP2.

The measurement method of the delay inequality can be that: the base station measures the uplink reference signal sent by the UE, such as the SRS, and obtains the delay inequality of the channel transmission among the UE and the AP1 and the AP2; and the base station needs to measure the timing synchronization deviation between the AP1 and AP2 points at the same time.

In step five, the base station measures and obtains the delay inequality information by itself, and calibrates the delay inequality, adjusts the AP1 and AP2 points to send the data to the UE, and perform the precoding of the data of the UE by using the PMI of the global precoding fed back by the UE.

Figure 4:
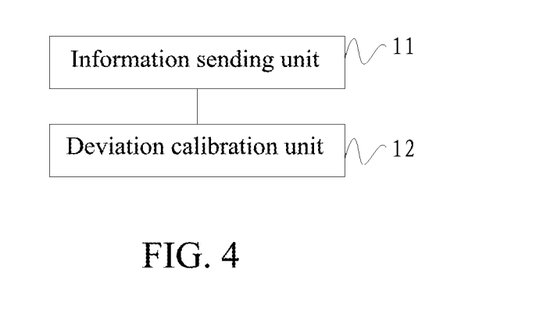
FIG. 4 is a structure diagram of a base station provided by an embodiment of the present document.

Referring to FIG. 4, the embodiment of the present document further provides a base station, including:

an information sending unit 11: configured to send to a user equipment (UE) a message instructing the UE to perform measurement and return deviation calibration information among multiple access points; and a deviation calibration unit 12: configured to calibrate a deviation among the multiple access points based on the deviation calibration information among the multiple access points returned by the UE.

The information sending unit 11 is configured to: send to the UE a message instructing the UE to measure a delay inequality and phase calibration information among the multiple access points, and instructing the UE to return the delay inequality and the phase calibration information obtained from the measurement; and the deviation calibration unit 12 is configured to: calibrate the delay inequality and a phase difference among the multiple access points based on the delay inequality and the phase calibration information among the multiple access points returned by the UE.

Alternatively, the information sending unit 11 is configured to: send to the UE a message instructing the UE to measure a delay inequality and phase calibration information among the multiple access points, and instructing the UE to return the phase calibration information among the multiple access points obtained from the measurement; and the deviation calibration unit 12 is configured to: calibrate the delay inequality and a phase difference among the multiple access points based on the phase calibration information among the multiple access points returned by the UE and the delay inequality obtained by the measurement of the deviation calibration unit itself.

Alternatively, the information sending unit 11 is configured to: send to the UE a message instructing the UE to measure a delay inequality and phase calibration information among the multiple access points, and instructing the UE to return a channel delay inequality in the delay inequality obtained by the measurement and the phase calibration information obtained by the measurement; and the deviation calibration unit 12 is configured to: calibrate the delay inequality and a phase difference among the multiple access points based on the channel delay inequality and the phase calibration information among the multiple access points returned by the UE, and a timing synchronization deviation in the delay inequality among the multiple access points obtained by the measurement of the deviation calibration unit itself.

Alternatively, the information sending unit 11 is configured to: send to the UE a message instructing the UE to measure a delay inequality, phase calibration information and amplitude calibration information among the multiple access points and instructing the UE to return the phase calibration information and the amplitude calibration information; and the deviation calibration unit 12 is configured to: calibrate the delay inequality and a phase difference among the multiple access points based on the delay inequality, the phase calibration information and the amplitude calibration information among the multiple access points returned by the UE, and the delay inequality obtained by the measurement of the deviation calibration unit itself;

alternatively, the information sending unit 11 is configured to: send to the UE a message instructing the UE to measure the delay inequality, the phase calibration information and the amplitude calibration information among the multiple access points and instructing the UE to return the phase calibration information, the amplitude calibration information and the delay inequality; and the deviation calibration unit 12 is configured to: calibrate the delay inequality and the phase difference among the multiple access points based on the phase calibration information, the amplitude calibration information and the delay inequality returned by the UE;

alternatively, the information sending unit 11 is configured to: send to the UE a message instructing the UE to measure the delay inequality, the phase calibration information and the amplitude calibration information among the multiple access points and instructing the UE to return the phase calibration information, the amplitude calibration information and the channel delay inequality; and the deviation calibration unit 12 is configured to: calibrate the delay inequality and the phase difference among the multiple access points based on the phase calibration information, the amplitude calibration information and the channel delay inequality among the multiple access points returned by the UE, and a timing synchronization deviation in the delay inequality among the multiple access points obtained by the measurement of the deviation calibration unit itself.

Alternatively, the information sending unit 11 is configured to: send to the UE a message instructing the UE to measure a delay inequality among the multiple access points and instructing the UE to return the delay inequality; and the deviation calibration unit 12 is configured to: calibrate the delay inequality among the multiple access points based on the delay inequality among the multiple access points returned by the UE.

Alternatively, the information sending unit 11 is configured to: send to the UE a message instructing the UE to measure a delay inequality among the multiple access points; and the deviation calibration unit 12 is further configured to: calibrate the delay inequality among the multiple access points based on the delay inequality among the multiple access points obtained by the measurement of the deviation calibration unit itself.

Figure 5:
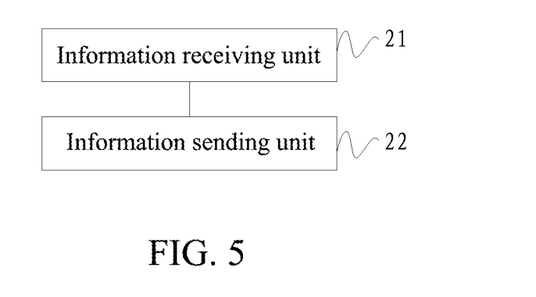
FIG. 5 is a structure diagram of a user equipment provided by an embodiment of the present document.

Referring to FIG. 5, the embodiment of the present document further provides a user equipment (UE), including:

an information receiving unit 21, configured to: receive a message instructing the UE to perform measurement and return deviation calibration information among multiple access points sent by a base station; and an information sending unit 22, configured to: measure the deviation calibration information among the multiple access points, and return the deviation calibration information to the base station based on an instruction of the base station.

The information receiving unit 21 is configured to: receive a message instructing the UE to perform measurement and return a delay inequality and phase calibration information among the multiple access points sent by the base station; and the information sending unit 22 is configured to: measure the delay inequality and the phase calibration information and return the delay inequality and the phase calibration information to the base station based on the instruction of the base station. Alternatively, the information receiving unit 21 is configured to: receive a message instructing the UE to measure a delay inequality and phase calibration information among the multiple access points and return the phase calibration information obtained from the measurement sent by the base station; and the information sending unit 22 is configured to: return the phase calibration information to the base station. Alternatively, the information receiving unit 21 is configured to: receive a message instructing the UE to measure a delay inequality and phase calibration information among the multiple access points sent by the base station and instructing the UE to return a channel delay inequality and the phase calibration information obtained from the measurement, wherein, the delay inequality comprises a timing deviation and the channel delay inequality; and the information sending unit 22 is configured to: measure the delay inequality and the phase calibration information and return the channel delay inequality and the phase calibration information to the base station based on the instruction of the base station.

Preferably, the information receiving unit 21 is configured to: receive a message instructing the UE to perform measurement and return amplitude calibration information among the multiple access points sent by the base station; and the information sending unit 22 is configured to: measure the amplitude calibration information and return the amplitude calibration information to the base station based on the instruction of the base station.

In the above-mentioned four situations, the UE measures the phase calibration information, specifically: measuring the delay inequality among every access point according to the channel matrix of every access point, amending the channel matrix of every access point according to the delay inequality obtained by the measurement, and measuring the phase calibration deviation according to the amended channel matrix.

The information receiving unit 21 is configured to: receive a message instructing the UE to measure a delay inequality among the multiple access points and instructing the UE to return the delay inequality obtained by the measurement sent by the base station; and the information sending unit 22 is configured to: measure the delay inequality and return the delay inequality to the base station based on the instruction of the base station; the information sending unit 22 is configured to: when the UE returns the delay inequality or the phase calibration information to the base station, carry precoding matrix indication information, and the precoding matrix indication information is used for instructing the base station to encode data sent to the UE;

wherein, the precoding matrix indication is obtained by the measurement after the UE amends the channel matrix of every access point.

Preferably, the information sending unit is configured to: measure the delay inequality by the following mode: measuring one delay inequality aiming at a bandwidth of a whole system based on the instruction of the base station.

Figure 6:
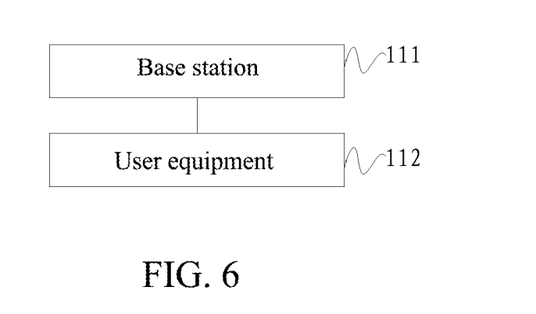
FIG. 6 is a structure diagram of a communication system provided by an embodiment of the present document.

Referring to FIG. 6, the embodiment of the present document further provides a communication system, comprising:

a base station 111, configured to send to a user equipment (UE) a message instructing the UE to perform measurement and return deviation calibration information among multiple access points; and calibrate the deviation among the multiple access points based on the deviation calibration information among the multiple access points returned by the UE; and a user equipment (UE) 112: configured to receive a message instructing the UE to perform the measurement and return the deviation calibration information among the multiple access points sent by the base station; and measure the deviation calibration information among the multiple access points and return the deviation calibration information to the base station based on an instruction of the base station.

In sum, in the embodiment of the present document, the UE receives the configuration message sent by the base station, and the configuration information instructs the UE to obtain the resources required by calibrating the deviations of different access points, and instructs the UE to feed back the resources or some information in the resources to the base station; wherein, if the resources include the delay calibration deviation produced when every access point sends the downlink data and the phase calibration deviation obtained according to the delay calibration deviation; when receiving the downlink data sent by every access point, the UE obtains the resources according to the configuration information, and feeds back the resources or some information in the resources to the base station; and the base station calibrates the deviation among every access point by using the resources or some information in the resources. It solves the phase difference problem brought by feeding back the codebook by every access point independently and the delay inequality problem among the AP points, and improves the system performance and the frequency spectrum efficiency.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above-mentioned embodiments are only used to illustrate the technical scheme of the present document while not to limit, and the present document is described in details only referring to the preferable embodiments. Those skilled in the art should understand that they can make the modifications and equivalents according to the technical scheme of the present document without departing from the spirit and scope of the present document, which should be embodied in the scope of the appending claims of the present document.

INDUSTRIAL APPLICABILITY

The embodiment of the present document solves the problem that there is a deviation among different AP access points with each other when different AP access points send the data to one same UE, thus improving the system performance and the frequency spectrum efficiency.

What we claim is:

1. A method for calibrating deviation among multiple access points, comprising:

in step A: a base station sending to a user equipment (UE) a message instructing the UE to perform measurement and return deviation calibration information among the multiple access points; and in step B: the base station calibrating deviation among the multiple access points based on the deviation calibration information among the multiple access points returned by the UE;

wherein the deviation calibration information comprises at least one of a delay inequality, a phase calibration information and an amplitude calibration information, the delay inequality comprises a channel delay inequality and a timing synchronization deviation;

wherein the step A comprises: the base station sending to the UE a message instructing the UE to measure the delay inequality among the multiple access points and instructing the UE to return the delay inequality; and wherein the step B comprises: the base station calibrating the delay inequality among the multiple access points based on the delay inequality among the multiple access points returned by the UE.

2. The method according to claim 1, wherein, the step A comprises: the base station sending to the UE a message instructing the UE to measure the delay inequality and the phase calibration information among the multiple access points, and instructing the UE to return the delay inequality and the phase calibration information; and the step B comprises: the base station calibrating the delay inequality and a phase difference among the multiple access points based on the delay inequality and the phase calibration information among the multiple access points returned by the UE.

3. The method according to claim 1, wherein, the step A comprises: the base station sending to the UE a message instructing the UE to measure the delay inequality and the phase calibration information among the multiple access points, and instructing the UE to return the phase calibration information among the multiple access points obtained through the measurement; and the step B comprises: the base station calibrating the delay inequality and a phase difference among the multiple access points based on the phase calibration information among the multiple access points returned by the UE and the delay inequality obtained by the measurement of the base station itself.

4. The method according to claim 1, wherein, the step A comprises: the base station sending to the UE a message instructing the UE to measure the delay inequality and the phase calibration information among the multiple access points, and instructing the UE to return the channel delay inequality in the delay inequality obtained by the measurement and the phase calibration information obtained by the measurement; and the step B comprises: the base station calibrating the delay inequality and a phase difference among the multiple access points based on the channel delay inequality and the phase calibration information among the multiple access points returned by the UE, and the timing synchronization deviation in the delay inequality among the multiple access points obtained by the measurement of the base station itself.

5. The method according to claim 1, wherein, the step A comprises: the base station sending to the UE a message instructing the UE to measure the delay inequality, the phase calibration information and the amplitude calibration information among the multiple access points and instructing the UE to return the phase calibration information and the amplitude calibration information; and the step B comprises: the base station calibrating the delay inequality and a phase difference among the multiple access points based on the delay inequality, the phase calibration information and the amplitude calibration information among the multiple access points returned by the UE, and the delay inequality obtained by the measurement of the base station itself;

or, the step A comprises: the base station sending to the UE a message instructing the UE to measure the delay inequality, the phase calibration information and the amplitude calibration information among the multiple access points and instructing the UE to return the phase calibration information, the amplitude calibration information and the delay inequality; and the step B comprises: the base station calibrating the delay inequality and the phase difference among the multiple access points based on the phase calibration information, the amplitude calibration information and the delay inequality returned by the UE;

or, the step A comprises: the base station sending to the UE the message instructing the UE to measure the delay inequality, the phase calibration information and the amplitude calibration information among the multiple access points and instructing the UE to return the phase calibration information, the amplitude calibration information and the channel delay inequality;

and the step B comprises: the base station calibrating the delay inequality and the phase difference among the multiple access points based on the phase calibration information, the amplitude calibration information and the channel delay inequality among the multiple access points returned by the UE, and a timing synchronization deviation in the delay inequality among the multiple access points obtained by the measurement of the base station itself.

6. The method according to claim 1, wherein,
the step B comprises: the base station calibrating the delay inequality among the multiple access points based on the delay inequality among the multiple access points obtained by the measurement of the base station itself.

7. A method for calibrating deviation among multiple access points, comprising:
in step A: a user equipment (UE) receiving a message instructing the UE to perform measurement and return deviation calibration information among the multiple access points sent by a base station; and
in step B: the UE measuring the deviation calibration information among the multiple access points, and returning the deviation calibration information to the base station based on an instruction of the base station; and
in step C: the base station calibrating deviation among the multiple access points based on the deviation calibration information returned by the UE;
wherein the deviation calibration information comprises at least one of a delay inequality, a phase calibration information and an amplitude calibration information, the delay inequality comprises a channel delay inequality and a timing synchronization deviation;
wherein the step A further comprises: the UE receiving a message instructing the UE to perform measurement and return the amplitude calibration information among the multiple access points sent by the base station; and
wherein the step B further comprises: the UE measuring the amplitude calibration information and returning the amplitude calibration information to the base station based on the instruction of the base station; and
wherein the step C further comprises: the base station calibrating the delay inequality and a phase difference among the multiple access points based on the amplitude calibration information among the multiple access points returned by the UE.

8. The method according to claim 7, wherein,
the step A comprises: the UE receiving a message instructing the UE to perform measurement and return the delay inequality and the phase calibration information among the multiple access points sent by the base station; and
the step B comprises: the UE measuring the delay inequality and the phase calibration information and returning the delay inequality and the phase calibration information to the base station based on the instruction of the base station; and
the step C comprises: the base station calibrating the delay inequality and the phase difference among the multiple access points based on the delay inequality and the phase calibration information among the multiple access points returned by the UE.

9. The method according to claim 7, wherein, the step A comprises: the UE receiving a message, sent by the base station, instructing the UE to measure the delay inequality and the phase calibration information among the multiple access points and return the phase calibration information obtained from the measurement; and
the step B comprises: the UE returning the phase calibration information to the base station; and the base station calibrating the delay inequality and phase information according to the phase calibration information returned by the UE and the delay inequality obtained by the measurement of the base station itself.

10. The method according to claim 7, wherein, the step A comprises: the UE receiving a message, sent by the base station, instructing the UE to measure the delay inequality and the phase calibration information among the multiple access points and instructing the UE to return a channel delay inequality and the phase calibration information obtained from the measurement, wherein, the delay inequality comprises a timing deviation and the channel delay inequality; and
the step B comprises: the UE measuring the delay inequality and the phase calibration information and returning the channel delay inequality and the phase calibration information to the base station based on the instruction of the base station, and the base station calibrating the delay inequality and the phase difference according to the channel delay inequality, the phase calibration information, and the timing deviation obtained by the measurement of the base station itself.

11. The method according to claim 7, wherein,
the step A comprises: the UE receiving information instructing the UE to measure the delay inequality among the multiple access points and instructing the UE to return the delay inequality obtained by the measurement sent by the base station; and
the step B comprises: the UE measuring the delay inequality and returning the delay inequality to the base station based on the instruction of the base station; and the step C comprises: the base station calibrating the delay inequality among the multiple access points based on the delay inequality among the multiple access points returned by the UE.

12. The method according to claim 7, wherein, in the step B, the UE measures the phase calibration information, comprising:

according to a channel matrix of every access point, measuring the delay inequality among all access points, amending the channel matrix of every access point according to the delay inequality obtained by the measurement, and measuring the phase calibration deviation according to the amended channel matrix.

13. The method according to claim 7, wherein, in the step B, the UE returns the delay inequality or the phase calibration information to the base station, and meanwhile, carries precoding matrix indication information, and the precoding matrix indication information is used for instructing the base station to encode the data sent to the UE;

wherein, the precoding matrix indication is obtained by the measurement after the UE amends the channel matrix of every access point.

14. The method according to claim 7, wherein, in the step B, the UE measures the delay inequality based on the instruction of the base station, comprising:

the UE measuring one delay inequality aiming at a bandwidth of a whole system based on the instruction of the base station.

15. A base station, comprising at least one processor for executing steps in an information sending unit and a deviation calibration unit, wherein:

the information sending unit is configured to send to a user equipment (UE) a message instructing the UE to perform measurement and return deviation calibration information among multiple access points; and the deviation calibration unit is configured to calibrate a deviation among the multiple access points based on the deviation calibration information among the multiple access points returned by the UE;

wherein the deviation calibration information comprises at least one of a delay inequality, a phase calibration information and an amplitude calibration information, the delay inequality comprises a channel delay inequality and a timing synchronization deviation;

wherein, the information sending unit is configured to: send to the UE a message instructing the UE to measure a delay inequality and phase calibration information among the multiple access points, and instructing the UE to return the delay inequality and the phase calibration information obtained from the measurement; and the deviation calibration unit is configured to: calibrate the delay inequality and a phase difference among the multiple access points based on the delay inequality and the phase calibration information among the multiple access points returned by the UE;

or, wherein, the information sending unit is configured to: send to the UE a message instructing the UE to measure a delay inequality and phase calibration information among the multiple access points, and instructing the UE to return the phase calibration information among the multiple access points obtained from the measurement; and the deviation calibration unit is configured to: calibrate the delay inequality and the phase difference among the multiple access points based on the phase calibration information among the multiple access points returned by the UE and the delay inequality obtained by the measurement of the deviation calibration unit itself;

or, wherein, the information sending unit is configured to: send to the UE a message instructing the UE to measure a delay inequality and phase calibration information among the multiple access points, and instructing the UE to return a channel delay inequality in the delay inequality obtained by the measurement and the phase calibration information obtained by the measurement; and the deviation calibration unit is configured to: calibrate the delay inequality and a phase difference among the multiple access points based on the channel delay inequality and the phase calibration information among the multiple access points returned by the UE, and a timing synchronization deviation in the delay inequality among the multiple access points obtained by the measurement of the deviation calibration unit itself;

or, wherein, the information sending unit is configured to: send to the UE a message instructing the UE to measure a delay inequality, phase calibration information and amplitude calibration information among the multiple access points and instructing the UE to return the phase calibration information and the amplitude calibration information; and the deviation calibration unit is configured to: calibrate the delay inequality and a phase difference among the multiple access points based on the delay inequality, the phase calibration information and the amplitude calibration information among the multiple access points returned by the UE, and the delay inequality obtained by the measurement of the deviation calibration unit itself;

or, the information sending unit is configured to: send to the UE a message instructing the UE to measure the delay inequality, the phase calibration information and the amplitude calibration information among the multiple access points and instructing the UE to return the phase calibration information, the amplitude calibration information and the delay inequality; and the deviation calibration unit is configured to: calibrate the delay inequality and the phase difference among the multiple access points based on the phase calibration information, the amplitude calibration information and the delay inequality returned by the UE;

or, the information sending unit is configured to: send to the UE a message instructing the UE to measure the delay inequality, the phase calibration information and the amplitude calibration information among the multiple access points and instructing the UE to return the phase calibration information, the amplitude calibration information and the channel delay inequality; and the deviation calibration unit is configured to: calibrate the delay inequality and the phase difference among the multiple access points based on the phase calibration information, the amplitude calibration information and the channel delay inequality among the multiple access points returned by the UE, and a timing synchronization deviation in the delay inequality among the multiple access points obtained by the measurement of the deviation calibration unit itself;

or, wherein, the information sending unit is configured to: send to the UE a message instructing the UE to measure a delay inequality among the multiple access points and instructing the UE to return the delay inequality; and the deviation calibration unit is configured to: calibrate the delay inequality among the multiple access points based on the delay inequality among the multiple access points returned by the UE;

or, wherein, the information sending unit is configured to: send to the UE a message instructing the UE to measure a delay inequality among the multiple access points; and the deviation calibration unit is further configured to: calibrate the delay inequality among the multiple access points based on the delay inequality among the multiple access points obtained by the measurement of the deviation calibration unit itself.

16. A user equipment (UE), comprising at least one processor for executing steps in an information receiving unit and an information sending unit, wherein:

the information receiving unit is configured to: receive a message instructing the UE to perform measurement and return deviation calibration information among multiple access points sent by a base station; and the information sending unit is configured to: measure the deviation calibration information among the multiple access points, and return the deviation calibration information to the base station based on an instruction of the base station;

wherein the deviation calibration information is used for calibrating deviation among the multiple access points by the base station, and wherein the deviation calibration information comprises at least one of a delay inequality, a phase calibration information and an amplitude calibration information, the delay inequality comprises a channel delay inequality and a timing synchronization deviation;

wherein, the information receiving unit is configured to: receive a message instructing the UE to perform measurement and return a delay inequality and phase calibration information among the multiple access points sent by the base station; and the information sending unit is configured to: measure the delay inequality and the phase calibration information and return the delay inequality and the phase calibration information to the base station based on the instruction of the base station;

wherein, the information receiving unit is configured to: receive a message instructing the UE to perform measurement and return amplitude calibration information among the multiple access points sent by the base station; and the information sending unit is configured to: measure the amplitude calibration information and return the amplitude calibration information to the base station based on the instruction of the base station;

wherein, the information sending unit is configured to: measure the phase calibration information by the following mode: according to a channel matrix of every access point, measuring the delay inequality among every access point, amending the channel matrix of every access point according to the delay inequality obtained by the measurement, and measuring the phase calibration deviation according to the amended channel matrix;

wherein, the information sending unit is further configured to: return the delay inequality or the phase calibration information to the base station, and meanwhile, carry precoding matrix indication information, and the precoding matrix indication information is used for instructing the base station to encode data sent to the UE; wherein, the precoding matrix indication is obtained by the measurement after the UE amends the channel matrix of every access point;

or, wherein, the information sending unit is configured to: measure the delay inequality by the following mode: measuring one delay inequality aiming at a bandwidth of a whole system based on the instruction of the base station;

or, wherein, the information receiving unit is configured to: receive a message, sent by the base station, instructing the UE to measure a delay inequality and phase calibration information among the multiple access points and return the phase calibration information obtained from the measurement; and the information sending unit is configured to: return the phase calibration information to the base station;

wherein, the information receiving unit is configured to: receive a message instructing the UE to perform measurement and return amplitude calibration information among the multiple access points sent by the base station; and the information sending unit is configured to: measure the amplitude calibration information and return the amplitude calibration information to the base station based on the instruction of the base station;

wherein, the information sending unit is configured to: measure the phase calibration information by the following mode: according to a channel matrix of every access point, measuring the delay inequality among every access point, amending the channel matrix of every access point according to the delay inequality obtained by the measurement, and measuring the phase calibration deviation according to the amended channel matrix;

wherein, the information sending unit is further configured to: return the delay inequality or the phase calibration information to the base station, and meanwhile, carry precoding matrix indication information, and the precoding matrix indication information is used for instructing the base station to encode data sent to the UE; wherein, the precoding matrix indication is obtained by the measurement after the UE amends the channel matrix of every access point;

or, wherein, the information sending unit is configured to: measure the delay inequality by the following mode: measuring one delay inequality aiming at a bandwidth of a whole system based on the instruction of the base station;

or, wherein, the information receiving unit is configured to: receive a message instructing the UE to measure a delay inequality and phase calibration information among the multiple access points sent by the base station and instructing the UE to return a channel delay inequality and the phase calibration information obtained from the measurement, wherein, the delay inequality comprises a timing deviation and the channel delay inequality; and the information sending unit is configured to: measure the delay inequality and the phase calibration information and return the channel delay inequality and the phase calibration information to the base station based on the instruction of the base station;

wherein, the information receiving unit is configured to: receive a message instructing the UE to perform measurement and return amplitude calibration information among the multiple access points sent by the base station; and the information sending unit is configured to: measure the amplitude calibration information and return the amplitude calibration information to the base station based on the instruction of the base station;

wherein, the information sending unit is configured to: measure the phase calibration information by the following mode: according to a channel matrix of every access point, measuring the delay inequality among every access point, amending the channel matrix of every access point according to the delay inequality obtained by the measurement, and measuring the phase calibration deviation according to the amended channel matrix;

wherein, the information sending unit is further configured to: return the delay inequality or the phase calibration information to the base station, and meanwhile, carry precoding matrix indication information, and the precoding matrix indication information is used for instructing the base station to encode data sent to the UE; wherein, the precoding matrix indication is obtained by the measurement after the UE amends the channel matrix of every access point;

or, wherein, the information sending unit is configured to: measure the delay inequality by the following mode: measuring one delay inequality aiming at a bandwidth of a whole system based on the instruction of the base station;

or, wherein, the information receiving unit is configured to: receive a message instructing the UE to measure a delay inequality among the multiple access points and instructing the UE to return the delay inequality obtained by the measurement sent by the base station; and the information sending unit is configured to: measure the delay inequality and return the delay inequality to the base station based on the instruction of the base station;

wherein, the information sending unit is further configured to: return the delay inequality or the phase calibration information to the base station, and meanwhile, carry precoding matrix indication information, and the precoding matrix indication information is used for instructing the base station to encode data sent to the UE; wherein, the precoding matrix indication is obtained by the measurement after the UE amends the channel matrix of every access point; wherein the delay inequality, the phase calibration information and the amplitude calibration information are used for calibrating a delay inequality and a phase difference among the multiple access points by the base station.

* * * * *